United States Patent [19]

Hara et al.

[11] Patent Number: 5,333,579
[45] Date of Patent: Aug. 2, 1994

[54] CONTROL DEVICE FOR CONTROLLING INTAKE AND EXHAUST VALVES OF INTERNAL COMBUSTION ENGINE

[75] Inventors: Seinosuke Hara; Yosihiko Yamada, both of Atsugi; Makoto Nakamura, Yokosuka, all of Japan

[73] Assignees: Unisia Jecs Corporation, Atsugi; Nissan Motor Co., Ltd., Yokohama, both of Japan

[21] Appl. No.: 8,801

[22] Filed: Jan. 27, 1993

[30] Foreign Application Priority Data

Jan. 27, 1992 [JP] Japan .................. 4-011591

[51] Int. Cl.⁵ .................................. F01L 1/34
[52] U.S. Cl. .................. 123/90.17; 123/90.31; 74/568 R
[58] Field of Search ........... 123/90.15, 90.17, 90.31, 123/90.6; 74/568 R

[56] References Cited

U.S. PATENT DOCUMENTS

| | | | |
|---|---|---|---|
| 3,633,555 | 1/1972 | Raggi | 123/90.17 |
| 5,056,478 | 10/1991 | Ma | 123/90.17 |
| 5,080,053 | 1/1992 | Parsons | 123/90.17 |
| 5,161,493 | 11/1992 | Ma | 123/90.17 |
| 5,199,393 | 4/1993 | Baldassini | 123/90.17 |

FOREIGN PATENT DOCUMENTS

57-198306  6/1981  Japan.
1311562  3/1973  United Kingdom.

Primary Examiner—E. Rollins Cross
Assistant Examiner—Weilun Lo
Attorney, Agent, or Firm—Foley & Lardner

[57] ABSTRACT

A control device controls intake and exhaust valves of an internal combustion engine. The device comprises a first flange provided by a cam shaft of the engine, which flange has a first radially extending elongate slit. A second flange faces the first flange with a certain clearance therebetween and is secured to a drive shaft to rotate therewith. The second flange has a second radially extending elongate slit. An annular member is disposed within the clearance and rotatable about an axis of the drive shaft. First and second pins are rotatably held by opposed sides of the annular member respectively. These pins are positioned at diametrically opposed positions with respect to a center of the annular member and slidably engaged with the first and second elongate slits respectively. A drive mechanism is employed for pivoting the annular member about a pivot axis eccentric to the axis of the drive shaft in accordance with an operating condition of the engine.

11 Claims, 7 Drawing Sheets

CONTROL DEVICE FOR CONTROLLING INTAKE AND EXHAUST VALVES OF INTERNAL COMBUSTION ENGINE

BACKGROUND OF THE INVENTION

1. Field of the Invention

The present invention relates in general to control devices for controlling internal combustion engines, and more particularly to control devices of a type which controls intake and exhaust valves of internal combustion engines.

2. Description of the Prior Art

In order to clarify the task of the present invention, one conventional control device of the above-mentioned type will be described with reference to FIGS. 8 and 9 of the accompanying drawings, which is disclosed in Japanese Utility Model First Provisional Publication No. 57-198306.

Figure 8:
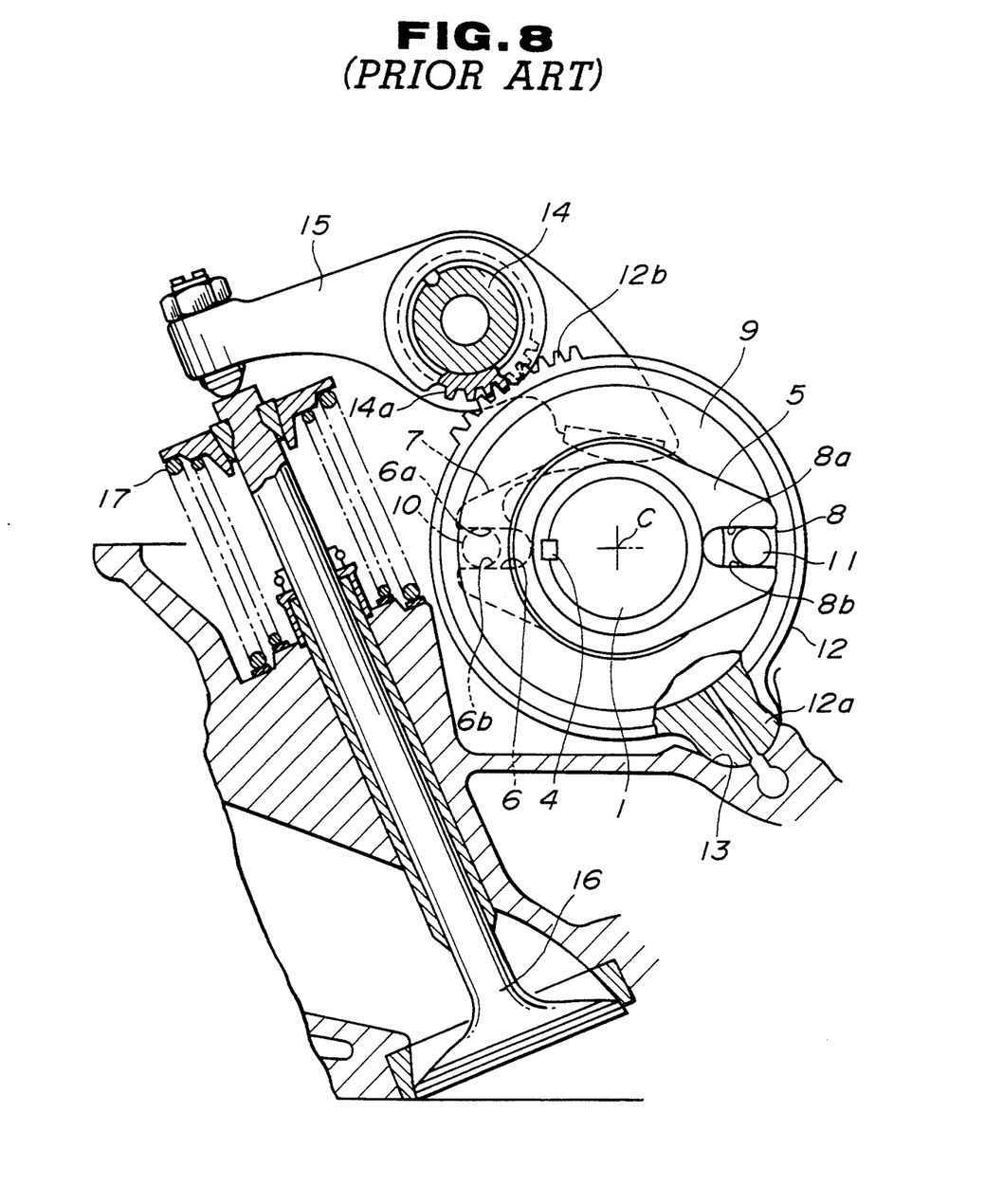
FIG. 8 is a sectional view of a conventional control device for controlling intake and exhaust valves of an internal combustion engine.
Figure 9:
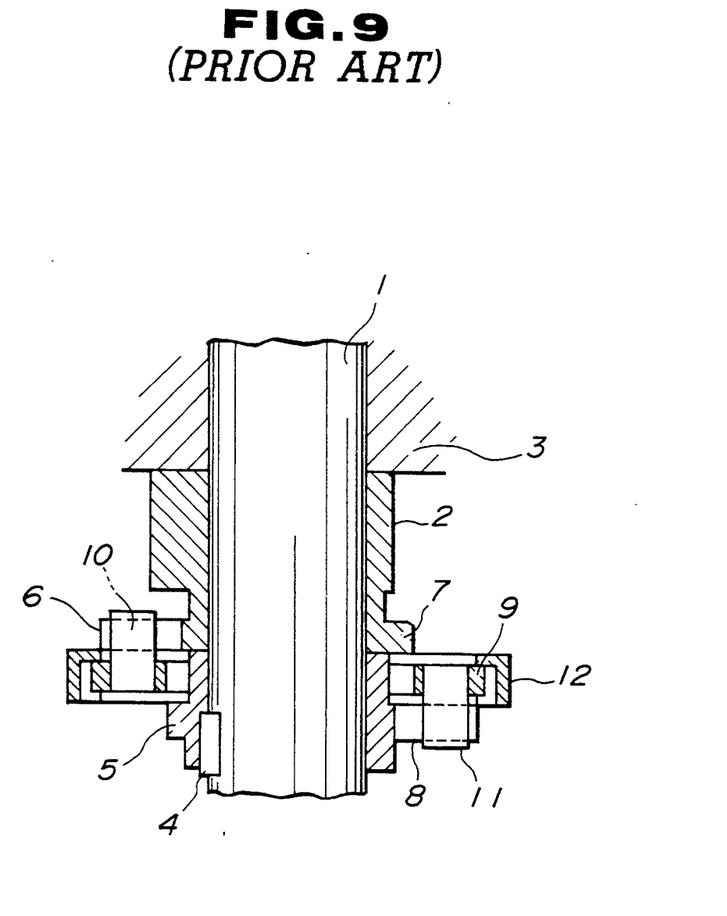
FIG. 9 is a sectional view taken along the line "D—D" of FIG. 8.

In the drawings, particularly FIG. 9, denoted by numeral 2 is a cam which is rotatably disposed about a cam shaft 1. The cam 2 functions to open an intake valve 16 against a biasing force of a valve spring 17 (see FIG. 8) with an aid of a rocker arm 15. As is seen from FIG. 9, the cam 2 is positioned in an axial direction by both a cam shaft receiving bracket 3 and a flange member 5 which is secured to the cam shaft 1 by means of a key 4.

As is seen from FIGS. 8 and 9 the cam 2 has at its one end a flange portion 7 which is formed with a generally U-shaped recess 6. The above-mentioned flange member 5 is also formed with a generally U-shaped recess 8.

As is seen from FIG. 9, between the flange member 5 and the flange portion 7, there is disposed an annular member 9. The annular member 9 has at its diametrically opposed portions respective pins 10 and 11 which are slidably engaged with the U-shaped recesses 6 and 8. The annular member 9 has a cylindrical outer surface rotatably supported by a control ring 12. As is seen from FIG. 8, the control ring 12 has at its outer peripheral portion a projection 12a which is rotatably held in a supporting bore 13 formed in a cylinder head. The control ring 12 has at a diametrically opposed portion of the projection 12a an arcuate toothed portion 12b which is meshed with a toothed ring 14a provided about a rocker shaft 14.

The control ring 12 is forced to pivot in one and the other directions about the supporting bore 13 by a drive mechanism (not shown) through the toothed ring 14a and the toothed portion 12b. That is, when the center "C" of the annular member 9 assumes the position as shown in FIG. 8, the center of the cam shaft 1 and that of the annular member 9 agree with each other Thus, under this condition, the annular member 9 rotates simultaneously together with the cam shaft 1 due to engagement between the pin 11 and the U-shaped recess 8, and the cam 2 rotates simultaneously together with the cam shaft 1 due to engagement between the pin 10 and the U-shaped recess 6.

When, in response to an operation change of the engine, the rocker shaft 14 supporting the rocket arm 15 is rotated but slightly by the drive mechanism (not shown), the control ring 12 is pivoted in a certain direction using the projection 12a as a fulcrum. With this, the center "C" of the annular member 9 becomes eccentric with respect to the center of the cam shaft 1. Accordingly, the pins 10 and 11 are slid in and along the respective U-shaped recesses 6 and 8, and the flange member 5 and the flange portion 7 are pivoted about the center of the cam shaft 1 in the eccentric direction. Thus, each time the cam shaft 1 makes one turn, the rotation phase of the annular member 9 changes relative to the cam shaft 1, and at the same time, the rotation phase of the cam 2 changes relative to the annular member 9. Accordingly, the cam 2 rotates relative to the cam shaft 1 with a phase difference double that of the annular member 9 relative to the cam shaft 1. Accordingly, the valve timing can be varied in accordance with the phase difference of the cam 2.

However, due to its inherent construction, the above-mentioned control device has drawbacks which will be described in the As is described hereinabove, each pin 10 or 11 is secured to the annular member 9 and the pin 10 or 11 is in contact with opposed side walls 6a and 6b (or, 8a and 8b) of the U-shaped recess 6 or 8. Accordingly, when a torque tile cam shaft 1 is transmitted to the cam 2 through the pins 10 and 11 and the U-shaped recesses 6 and 8, and when, due to a pivotal movement of the annular member 9, the pins 10 and 11 slide in and along the U-shaped recesses 6 and 8, a marked concentrated load tends to appear at portions where the pins 10 and 11 contact the opposed side walls 6a, 6b, 8a and 8b of the U-shaped recesses 6 and 8, which causes an increased bearing stress at such portions. Thus, the pins 10 and 11 and the opposed side walls 6a, 6b, 8a and 8b of the U-shaped recesses 6 and 8 are easily abraded and thus after long use, undesired gaps tends to appear between the pins 10 and 11 and the recesses 6 and 8. Such gaps bring about noisy movement of the pins 10 and 11 in the U-shaped recesses 6 and 8 in response to the positive and negative torque change of the cam shaft 1. Furthermore, such gaps cause a lag in valve timing. In other words, such gaps lowers the controllability of the control device.

SUMMARY OF THE INVENTION

It is therefore an object of the present invention to provide a control device controlling intake and exhaust valves of an internal combustion engine, which control device is free of the above-mentioned drawbacks.

According to the present invention, there is provided a control device for use in an internal combustion engine which has a drive shaft, a cam shaft coaxially disposed about the drive shaft, and a plurality of came formed about the cam shaft for operating intake and exhaust valves. The control device comprises a first flange provided by the cam shaft, the first flange having a first elongate slit which extends radially; a second flange facing the first flange with a certain clearance therebetween and being secured to the drive shaft to rotate therewith, the second flange having a second elongate slit which extends radially; an annular member disposed within the clearance and rotatable about an axis of the drive shaft; first and second pins rotatably held by opposed sides of the annular member respectively, the first and second pins being positioned at diametrically opposed positions with respect to a center of the annular member and slidably engaged with the first and second elongate slits respectively; and drive means for pivoting the annular member about a pivot axis eccentric to the axis of the drive shaft in accordance with an operating condition of the engine.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Referring to FIGS. 1 to 6, there is shown a control device of the present invention, which controls intake and exhaust valves of an internal combustion engine.

Figure 1:
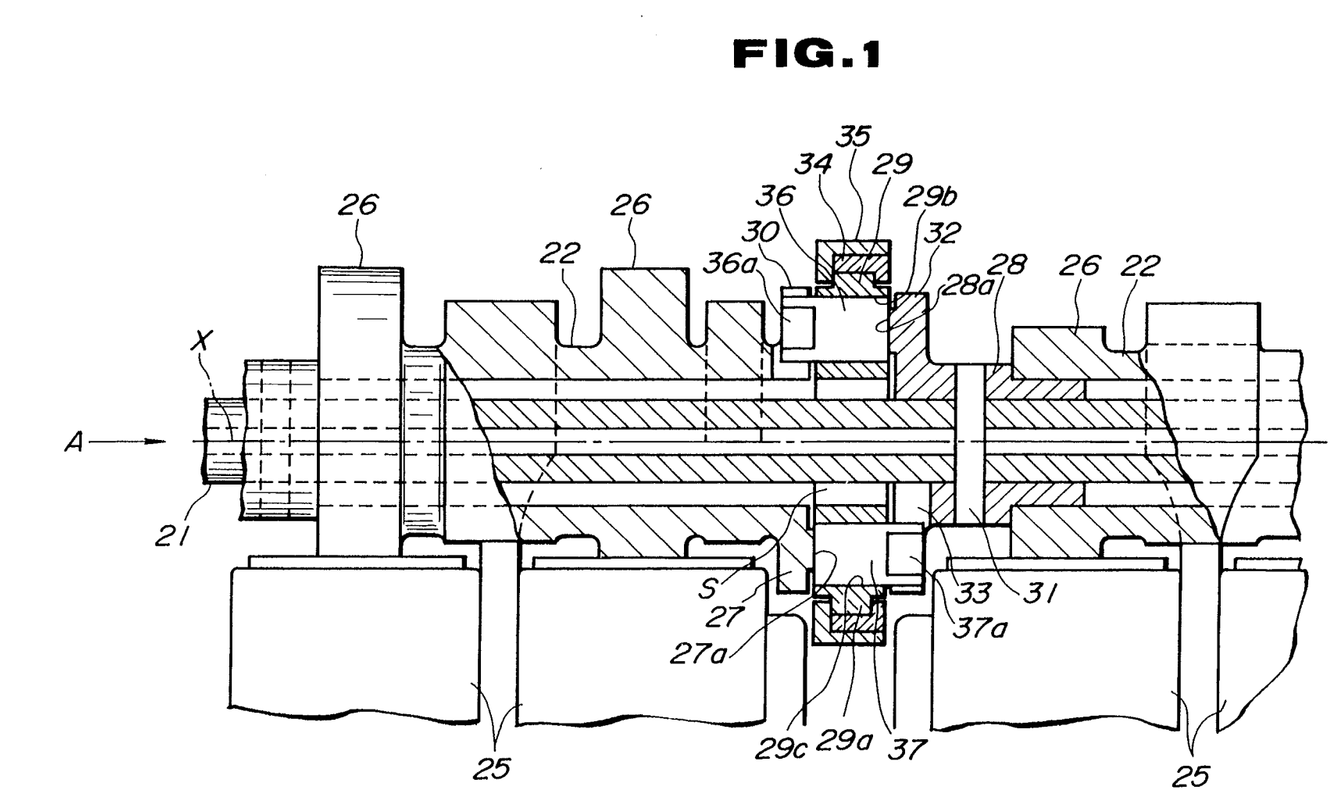
FIG. 1 is a partially broken sectional view of an essential portion of a control device according to the present invention.

In FIG. 1, denoted by numeral 21 is a drive shaft go which a torque is applied from an engine crankshaft (not shown) and a sprocket (not shown). Denoted by numeral 22 is a cam shaft which is disposed about the drive shaft with a certain annular clearance therebetween. These shafts 21 and 22 are arranged about a common axis "X". The drive shaft 21 is of a hollow member and extends in the longitudinal direction of the engine.

Figure 2:
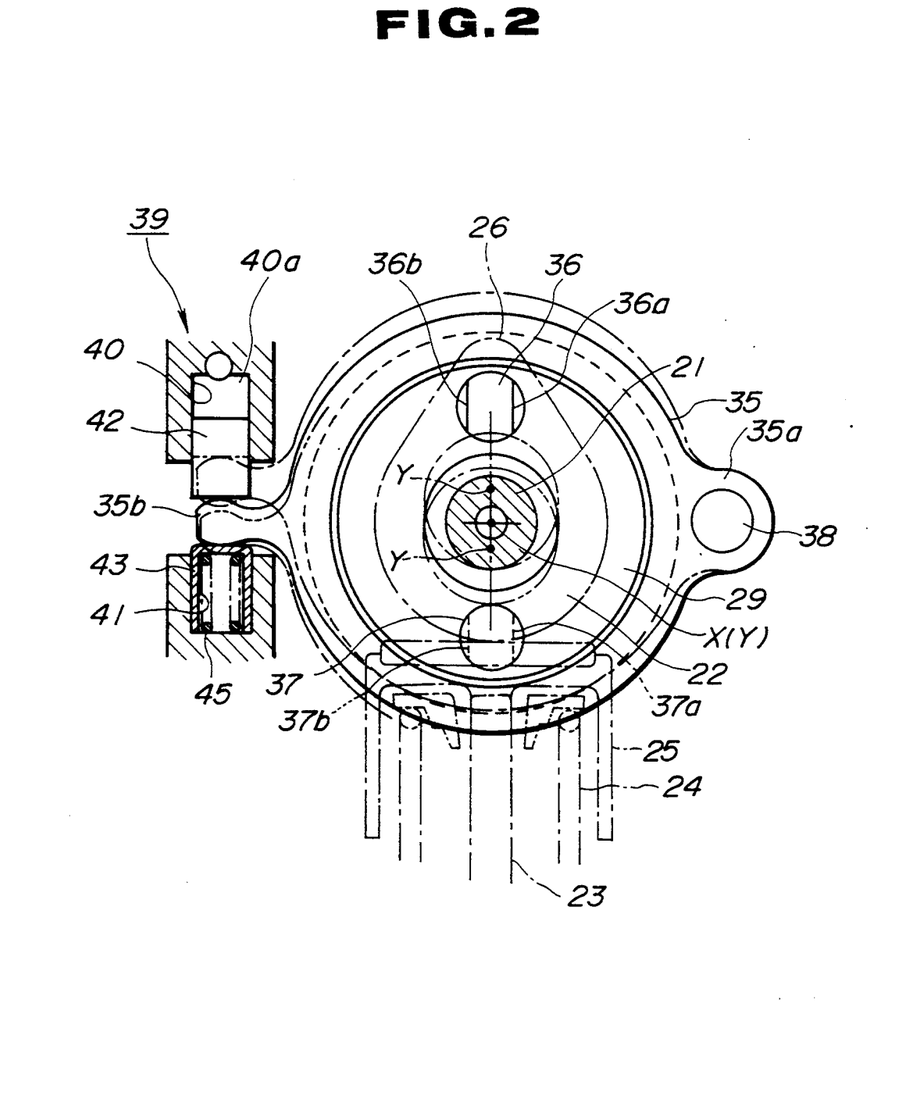
FIG. 2 is a view taken from the direction of the arrow "A" of FIG. 1.

The cam shaft 22 is of a hollow member and rotatably held by bearings (not shown) provided on upper ends of a cylinder head (not shown), As is understood from FIG. 2, the cam shaft 22 is integrally formed at axially spaced portions thereof with a plurality of cams 26. Each cam 26 functions to open an intake valve 23 through a valve lifter 25 against a biasing force of a valve spring 24.

As is seen from FIG. 1, the cam shaft 22 is divided into two shaft parts which are axially spaced from each other. One shaft part, that the left shaft part, has at its inside end a flange portion 27 Between the two shaft there are arranged a sleeve 28 and an annular member 29, as shown.

Figure 3:
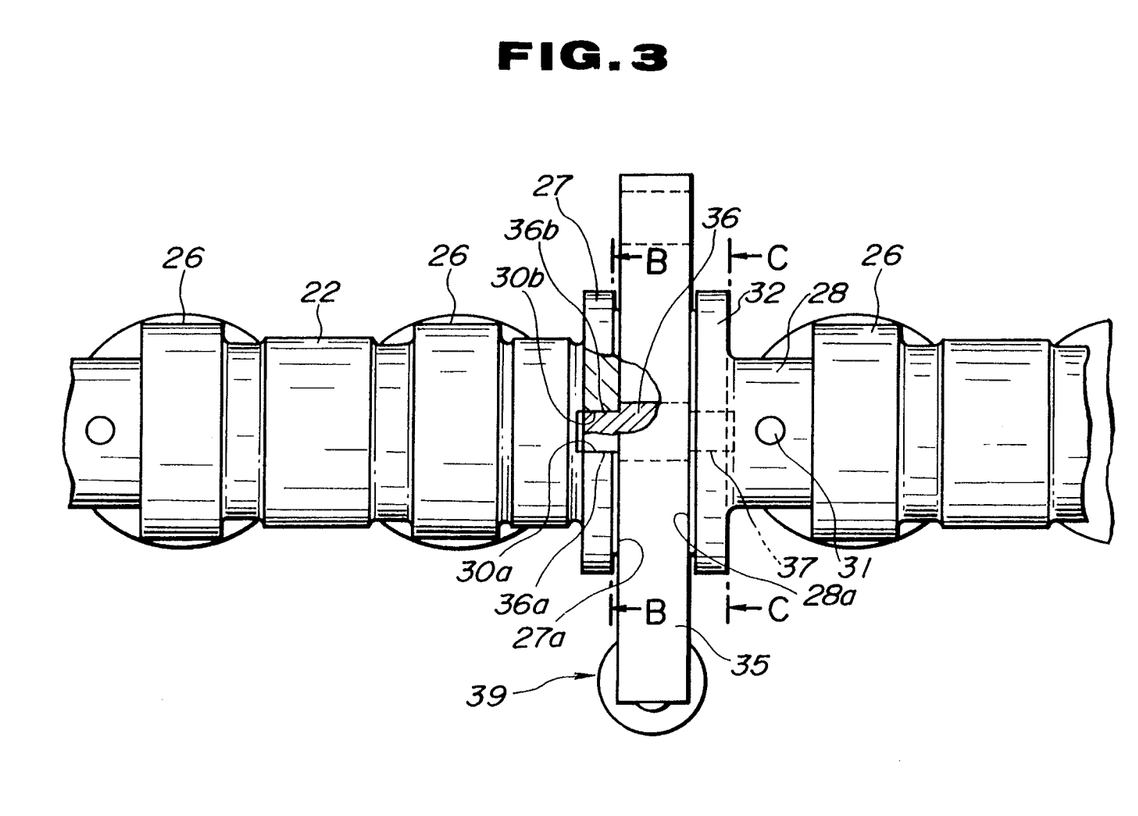
FIG. 3 is a plan view of the essential portion of the control device of the invention.
Figure 4:
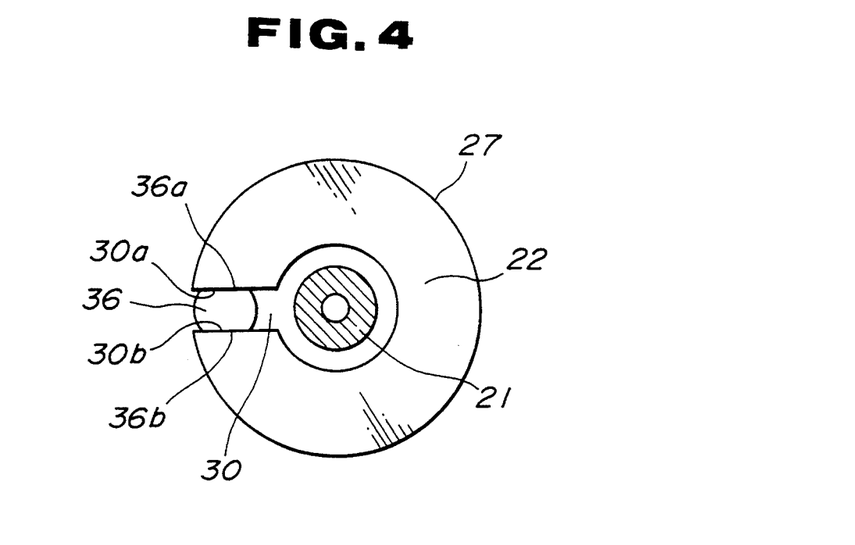
FIG. 4 is a sectional view taken along the line "B—B" of FIG. 3.

As is understood from FIGS. 3 and 4, the flange portion 27 of the left shaft part is formed with an elongate slit 30 which extends radially outward from the hollow center portion thereof. The slit 30 has an even width therethroughout. As is seen from FIG. 3, the flange portion 27 is integrally formed at the inside surface with an annular projection 27a which is in contact with one side surface of the annular member 29.

As is understood from FIG. 1, the sleeve 28 has a reduced end portion rotatably disposed in the right shaft part of the cam shaft 22. The sleeve 28 is fixed to the drive shaft 21 by means of a connecting pin 31 which passes through the sleeve and the drive shaft 21.

Figure 5:
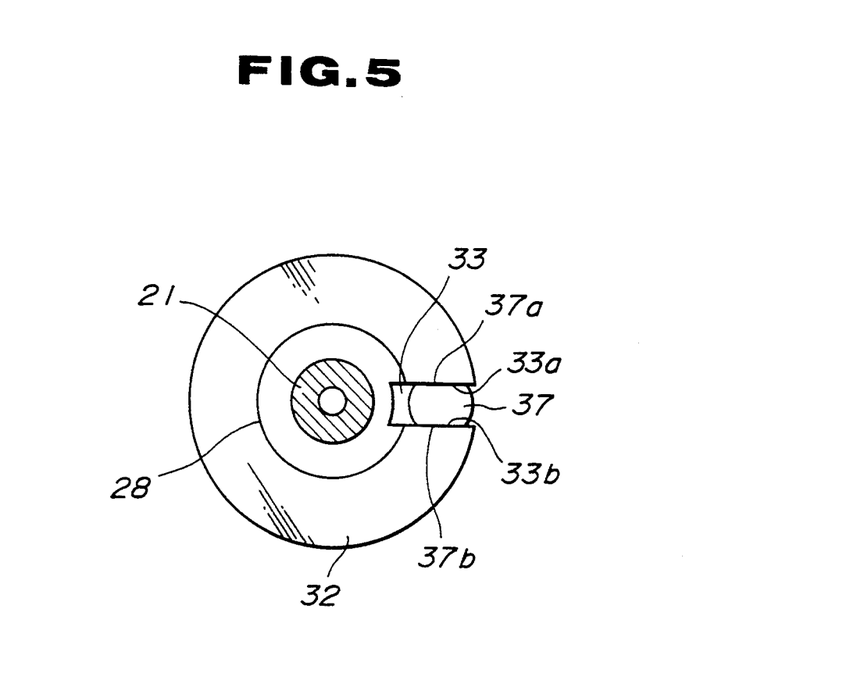
FIG. 5 is a sectional view taken along the line "C—C" of FIG. 3.

The sleeve 28 has at its inside end a flange portion 32, and as is seen from FIG. 5, the flange portion 32 is formed with an elongate slit 33 which extends radially outward. The slit 33 has an even width therethroughout. Similar to the above-mentioned flange portion 27, the flange portion 32 is integrally formed with an annular projection 28a (see FIG. 1) which is in contact with the other side surface of the annular member 29.

As is seen from FIGS. 1, 4 and 5, the elongate slit 30 of the flange portion 27 of the left shaft part and the other elongate slit 33 of the flange portion 32 of the sleeve 28 are positioned at diametrically opposed portions with respect to the axis of the drive shaft 21.

The annular member 29 has an inner diameter which is substantially identical to that of the cam shaft 22. As is seen from FIG. 1, the annular member 29 is coaxially disposed about the drive shaft 21 with an annular space "S" therebetween. The annular member 29 is formed thereabout with a coaxial annular ridge 29a which is rotatably received in a control ring 35 through an annular bearing 34. Furthermore, the annular member 29 has at diametrically opposed portions thereof respective holding openings 29b and 29c which rotatably hold respective pins 36 and 37. These pins 36 and 37 are slidably engaged with the above-mentioned elongate slits 30 and 33. As is understood from FIG. 1, these pins 36 and 37 are projected in axially opposite directions.

It is to be noted than each pin 36 or 37 has a base portion rotatably held in the holding opening 29b or 29c of the annular member 29.

It is further to be noted that, as is seen from FIGS. 4 and 5, each pin 36 or 37 has at diametrically opposed portions thereof flat parallel surfaces 36a and 36b (or, 37a and 37b) which slidably contact with opposed parallel side walls 30a and 30b (or, 33a and 33b) of the slit 30 or 33.

As is seen from FIG. 2, the control ring 35 has, as its outer peripheral portion, a perforated projection 35a through which a supporting pin 38 passes. Thus, the control ring 35 is pivotal upward and downward about the axis of the supporting pin 38. The control ring 35 has, at a diametrically opposite portion of the perforated projection 35a, a lever portion 35b which extends radially outward. The lever portion 35b is driven by a drive mechanism 39 for achieving the pivotal movement of the control ring 35 about the supporting pin 38.

Figure 6:
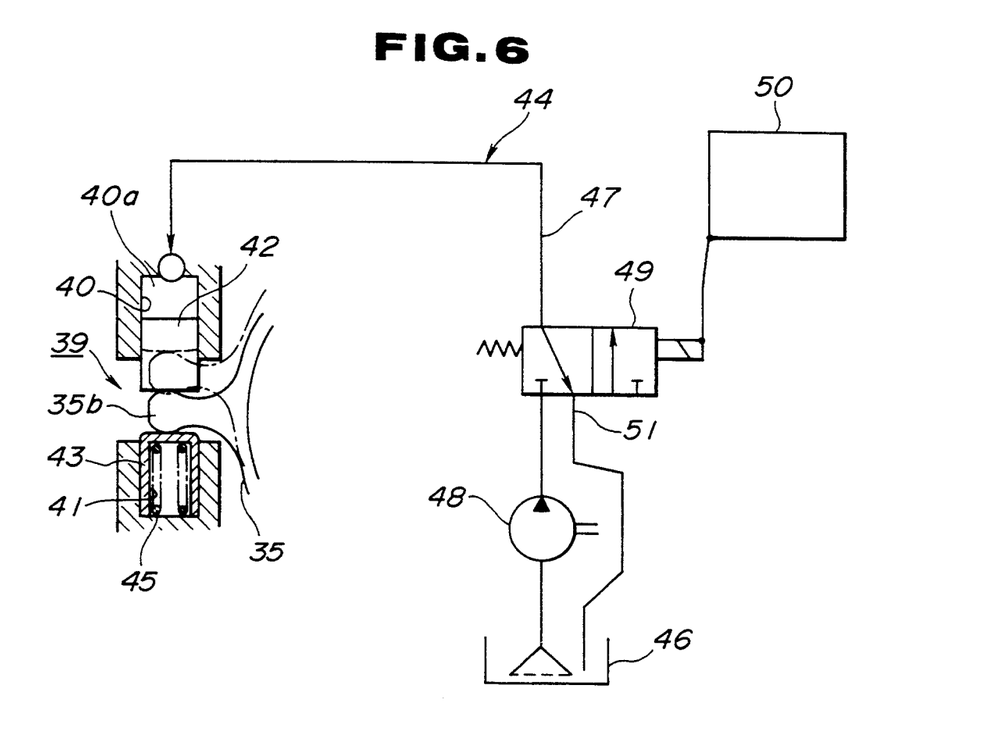
FIG. 6 is a schematic view of a drive means used in the present invention.

As is seen from FIGS. 2 and 6, the drive mechanism 39 comprises first and second cylinders 40 and 41 which are formed in the cylinder head in a manner to face each other. A piston 42 and a retainer 43 are slidably and respectively received in the first and second cylinders 40 and 41 having the lever portion 35b of the control ring 35 sandwiched therebetween. As shown in the drawings lever portion 35b has round surfaces to which the respective head portions of the piston 42 and the retainer 43 contact.

As shown in FIG. 6, a hydraulic chamber 40a defined in the first cylinder 40 is fluidly connected with a hydraulic circuit 44. That is, the piston 42 is moved in fore-and-aft direction in the first cylinder 40 in response to operation of the hydraulic circuit 44.

The retainer 43 in the second cylinder 41 is a tubular member with a closed head portion. The retainer 43 is biased toward the first cylinder 40 by means of a coil spring 45 compressed in the second cylinder 41.

As is shown in FIG. 6, the hydraulic circuit 44 comprises a hydraulic passage 47 which has one end exposed no an oil pan 46 and the other end connected to the hydraulic chamber 40a of the drive mechanism 39. An oil pump 48 is disposed in the hydraulic passage 47, and an electromagnetic valve 49 is disposed in the hydraulic passage 47 downstream of the oil pump 48. As shown, the electromagnetic valve 49 is of a two-position type having three ports. The valve 49 is controlled by a controller 50. By analyzing an engine speed, an intake air amount, etc., the controller 50 senses an operation condition of the engine and issues "ON-OFF" signals to the valve 49 to control the same. That is, when the controller 50 issues "ON" signal, the valve 49 establishes a communication between the oil pump 48 and the hydraulic chamber 40a, while, when the controller 50 issues "OFF" signal, the valve 49 blocks communication while establishing a communication between the hydraulic chamber 40a and a drain passage 51.

In the following, operation will be described with reference to the drawings, particularly, FIGS. 2 and 6.

For ease of description, the description will be commenced with respect to a condition wherein the control ring 35 assumes its uppermost angular position as shown by a phantom line (viz., dot-dash line) in FIG. 2.

When now the controller 50 issues "ON" signal to the electromagnetic valve 49, the valve 49 establishes a communication between the oil pump 48 and the hydraulic chamber 40a. Accordingly, oil is fed from the oil pump 48 to the hydraulic chamber 40a through the hydraulic passage 47. Thus, the pressure in the hydraulic chamber 40a is increased and thus, as is seen from FIGS. 2 and 6, the piston 42 is moved downward against the biasing force of the coil spring 45, moving down the lever portion 35b of the control ring 35 and thus pivoting down the control ring 35 about the supporting pin 38. When, the control ring 35 is pivoted down to its intermediate position as shown by solid line in FIGS. 2 and 6, a rotation center "Y" of the annular member 29 agrees with the axis "X" of the drive shaft 21. Under this condition, there is no rotation phase difference between the annular member 29 and the drive shaft 21. Furthermore, since, under such condition, the center of the cam shaft 22 agrees with the center "Y" of the annular member 29, there is no rotation phase difference therebetween. Accordingly, in response to rotation of the drive shaft 21, the sleeve 28, which is fixed thereto through the connecting pin 31, is synchronously rotated, and also the cam shaft 22, which is fixed thereto through the elongate slit 33 of the sleeve 28, the pin 37, the annular member 29, the other pin 36 and the elongate slit 30 of the cam shaft 22, is synchronously rotated That is, the drive shaft 21 and the cam shaft 22 rotate together about the axis "X" like a single unit.

When thereafter due to a change in engine operation condition, the controller 50 issues "OFF" signal to the valve 49, the valve 49 blocks the communication between the oil pump 48 and the hydraulic chamber 40a and establishes a communication between the hydraulic chamber 40a and the drain passage 51. Under this condition, the oil in the hydraulic chamber 40a is drained into the oil pan 46 through the drain passage 51. Thus, the pressure in the hydraulic chamber 40a is reduced and thus, due to the biasing force of the valve spring 24 and the coil spring 45, the lever portion 35b of the control ring 35 is moved upward inducing an upward pivoting of the control ring 35 to its uppermost position, as shown by a phantom line (viz., dot-dash line) in FIGS. 2 and 6, where the rotation center "Y" of the annular member 29 is eccentric to the axis "X" of the drive shaft 21. Accordingly, each time the drive shaft 21 makes one turn, the contacting portion between the elongate slit 33 of the sleeve 28 and the pin 37 and than between the elongate slit 30 of the cam shaft 22 and the other pin 36 are forced to make a round travel while continuously varying (viz., increasing and reducing) the angular speed of the annular member 29. That is, during the time for which the drive shaft 21 makes one turn, the annular member 29 rotates at uneven angular speed.

That is, when the contacting portion between the elongate slit 33 and the pin 37 moving toward the center "X" of the drive shaft 21, the contacting portion between the elongate slit 30 and the pin 36 is moving away from the center "X". Under this condition, the annular member 29 is forced to rotate at a reduced angular speed relative to the drive shaft and the cam shaft 22 is forced to rotate at a reduced angular speed relative to the annular member 29. Thus, under such condition, the cam shaft 22 is forced to rotate at a double reduced speed relative to the drive shaft 21.

While, when, due to a further change in engine operation condition, the piston 42 is forced to press down the lever portion 35b of the control ring 35 against the force of the coil spring 41, the annular member 29 is pivoted downward beyond the intermediate position toward its lowermost position as shown by a phantom line (viz., dot-dot-dash line) in FIG. 2. Under this condition, the contacting portion between the elongate slit 30 and the pin 36 is positioned near the common axis "X" and the cam shaft 22 is forced to rotate at a double increased speed relative to the drive shaft 21.

Figure 7A:
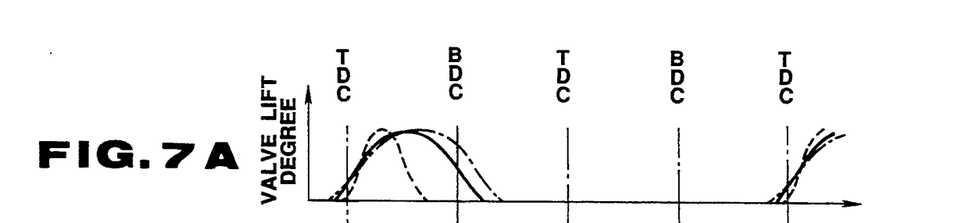
FIGS. 7A and 7B are graphs showing respectively a valve lift degree and a rotation phase difference between a drive shaft and a cam shaft with respect to a crank angle.
Figure 7B:
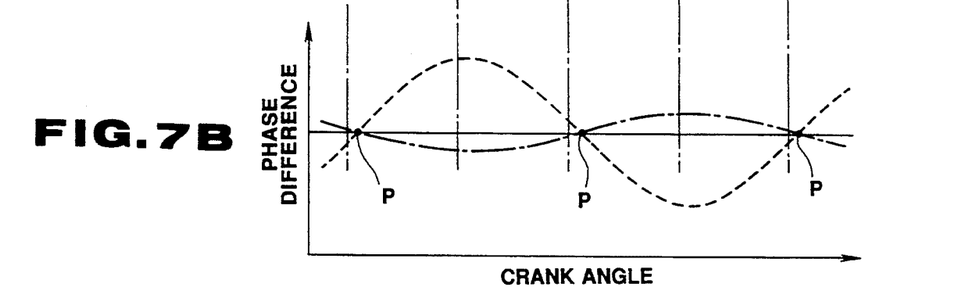

Accordingly, due to the change of the above-mentioned angular speed, the rotation phase difference between the cam shaft 22 and the cam 26 is varied in such a manner as is depicted by the graph of FIG. 7B, and as is depicted by the graph of FIG. 7A, the valve timing is varied in accordance with the phase difference of the cam shaft 22 keeping the valve lift degree constant.

That is to say, when the angular speed of the cam shaft 22 is relatively large, the phase difference between the cam shaft 22 and the drive shaft 21 is advanced until they rotate at an equal speed, and when thereafter the angular speed of the cam shaft 22 becomes relatively small, the phase difference is delayed until they rotate at an equal speed. Thus, as is shown in the graph of FIG. 7B, during a period for which the phase difference is being varied to its maximum or minimum value, there is produced an identical phase point "P". In case of change of rotation phase shown by a broken line in FIG. B, before the point "P", the valve opening timing of the intake valve 23 is delayed, bus after the point "P", the valve opening timing is advanced, so that as is shown by a broken line in the Graph of FIG. A, the operation angle of the valve is reduced. While, in case of change of rotation phase shown by a phantom line in FIG. B, before the point the valve opening timing of the intake valve 23 is advanced, but after the point "P", the valve opening timing is delayed, so that as is shown by a phantom line in the Graph of FIG. A, the operation angle of the valve is increased, The solid line shown in the Graph of FIG. A shows a case wherein the centers "X" and "Y" agree with each other.

In the following, advantages of the present invention will be described.

Each pin 36 or 37 has at diametrically opposed portions flat surfaces 36a and 36b (or, 37a and 37b) which are in slidable contact with the opposed side walls 30a and 30b (or, 33a and 33b) of the elongate slit 30 or 33 in a so-called surface-to-surface contacting manner. Accordingly, when a torque of the drive shaft 21 is transmitted to the cam shaft 22 and/or when a relative sliding movement takes place between the pins 36 and 37 and the elongate slits 30 and 33 having the annular member 29 kept eccentric, generation of undesired concentrated load therebetween is suppressed and thus the bearing stress is lowered. As a result, the pins 36 and 37 and the side walls 30a, 30b, 33a and 33b of the elongate slits 30 and 33 are prevented from a marked abrasion.

Furthermore, the pins 36 are 37 are rotatably held by the annular member 29. Thus, during the pivotal movement of the annular member 29, the pins 36 and 37 are suitably rotated relative to the annular member 29 permitting the surface-to-surface contact between the flat surfaces 36a, 36b, 37a and 37b of the pins 36 and 37 and the opposed side walls 30a, 30b, 33a and 33b of the elongate slits 30 and 33. Thus, protection of the abrasion is much assured.

Although the above description is directed to the device for controlling the intake valve 23, the invention is also applicable to an exhaust valve of the engine.

What is claimed is:

1. In an internal combustion engine having a drive shaft, a cam shaft coaxially disposed about said drive shaft, and at least one cam formed about said cam shaft for operating at least one of an intake and an exhaust valve,
  a timing control device comprising:
   a first flange provided by said cam shaft, said first flange having a first elongate slit which extends radially;
   a second flange facing said first flange with a certain clearance therebetween and being secured to said drive shaft to rotate therewith, said second flange having a second elongate slit which extends radially;
   an annular member disposed within said clearance and rotatable about an axis of said drive shaft;
   first and second pins held on opposed sides of said annular member respectively, said first and second pine being positioned at opposed positions with respect to a center of said annular member and slidably engaged with said first and second elongate slits respectively; and
   drive means for pivoting said annular member about a pivot axis eccentric to the axis of said drive shaft in accordance with an operating condition of the engine,
   wherein said first and second pins are rotatable about respective longitudinal axes of said first and second pins within said annular member.

2. A control device as claimed in claim 1, in which each of said first and second pins has at diametrically opposed portions thereof flat parallel surfaces which are slidably engaged with opposed parallel side walls of each of said first and second elongate slits.

3. A Control device as claimed in claim 2, in which each Of said first and second pins has a base portion rotatably held in a holding opening defined by said annular member.

4. A control device as claimed in claim 2, in which said first flange is formed about an axial end of said cam shaft and in which said second flange is formed about a sleeve which is secured to said drive shaft by means of a connecting pin.

5. A control device as claimed in claim 2, in which each of said first and second flanges is formed with an annular projection which is in contact with one side surface of said annular member.

6. A control device as claimed in claim 2, in which said drive means comprises:
  a control ring in which said annular member is rotatably received;
  an annular bearing operatably disposed between said control ring and said annular member;
  first means for permitting said control ring to pivot about said pivot axis: and
  second means for forcing-said control ring to pivot about said pivot axis in accordance with the operating condition of said engine.

7. A control device as claimed in claim 6, in which said first means comprises:
  a projection formed on an outer peripheral part of said control ring; and
  a supporting pin which passes through an opening possessed by said projection.

8. A control device as claimed in claim 7, in which said second means comprises:
  a lever portion formed on said control ring at a position diametrically opposite to said outer peripheral part; and
  a hydraulically operated drive mechanism for moving said lever portion in fore-and-aft direction in accordance with the operating condition of the engine.

9. A control device as claimed in claim 6, in which said first means is so constructed as to permit said annular member to assume an angular position wherein said annular member is concentric with said drive shaft.

10. In an internal combustion engine having a drive shaft, a cam shaft coaxially disposed about said drive shaft, and a plurality of cams formed about said cam shaft for operating intake and exhaust valves,
  a control device comprising:
   a first flange provided by said cam shaft, said first flange having a first elongate slit which extends radially;
   a second flange facing said first flange with a certain clearance therebetween and being secured to said drive shaft to rotate therewith, said second flange having a second elongate slit which extends radially;
   an annular member disposed within said clearance and rotatable about an axis of said drive shaft;
   first and second pins rotatably held by opposed sides of said annular member respectively, said first and second pins being positioned at diametrically opposed positions with respect to a center of said annular member and slidably engaged with said first and second elongate slits respectively; and
   drive means for pivoting said annular member about a pivot axis eccentric to said axis of said drive shaft in accordance with an operating condition of said engine,
   wherein each of said first and second Dins has at diametrically opposed portions thereof flat parallel surfaces which are slidably engaged with opposed parallel side walls of each of said first and second elongate slits, wherein said first flange is formed about an axial end of said cam shaft and in which said second flange is formed about a sleeve which is secured to said drive shaft by means of a connecting pin, and wherein said sleeve has a reduced end portion rotatably disposed in a hollow shaft which is a separated part of said cam shaft.

11. In an internal combustion engine having a drive shalt, a cam shalt coaxially disposed about said drive shaft, and at least one cam formed about said cam shaft for operating at least one of an intake and an exhaust valve, a timing control device comprising:

a first flange provided by said cam shaft, said first flange having a first elongate slit which extends radially;

a second flange facing said first flange with a certain clearance therebetween and being secured to said drive shaft to rotate therewith, said second flange having a second elongate slit which extends radially;

an annular member disposed within said clearance and rotatable about an axis of said drive shaft;

first and second pins held on opposed sides of said annular member respectively, said first and second pins being positioned at opposed positions with respect to a center of said annular member and slidably engaged with said first and second elongate slits respectively; and drive means for pivoting said annular member about a pivot axle eccentric to the axis of said drive shaft in accordance with an operating condition of the engine, wherein said first and second pins are rotatable about respective longitudinal axes of said first and second pins within said annular member, and wherein each of said first and second pins has at diametrically opposed outer side portions flat parallel surfaces which are slidably engaged with opposed parallel side walls of each of said first and second elongate slits.

* * * * *